May 16, 1967     E. KOHL ETAL     3,319,536
PISTON FOR INTERNAL COMBUSTION ENGINES
Filed Feb. 23, 1966
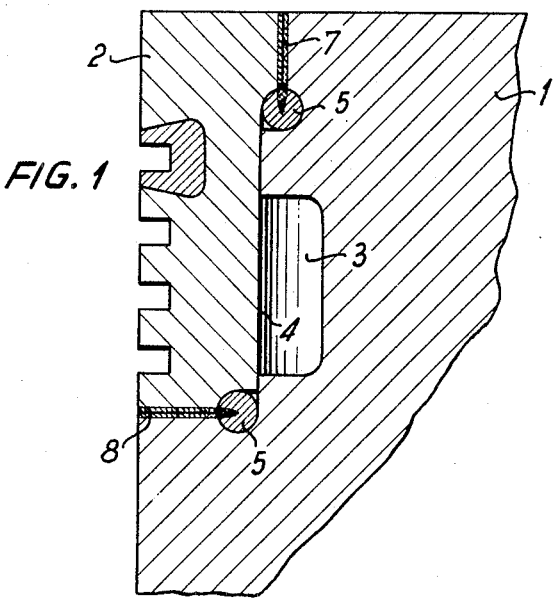
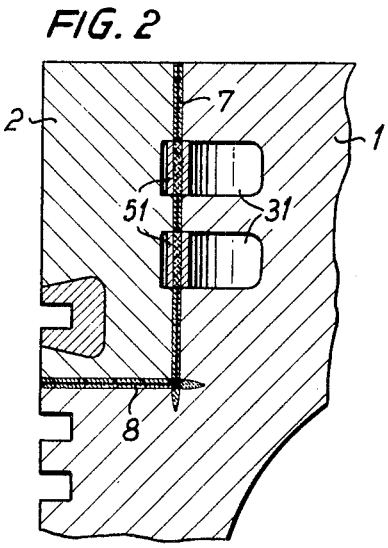
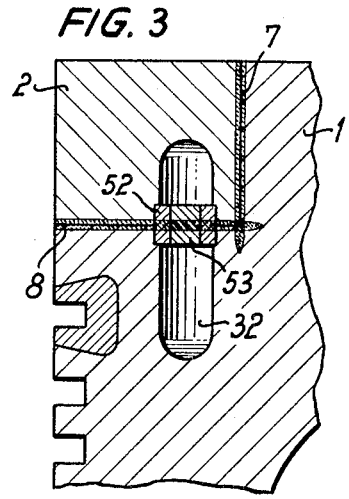
INVENTORS
Eberhard Kohl
Rudolf Maier
BY Bailey, Stephens + Huettig
ATTORNEYS 3,319,536
PISTON FOR INTERNAL COMBUSTION
ENGINES
Eberhard Kohl, Stuttgart, and Rudolf Maier, Stuttgart-
Weilimdorf, Germany, assignors to MAHLE Komm.-
Ges., Stuttgart-Bad Cannstatt, Germany
Filed Feb. 23, 1966, Ser. No. 529,342
Claims priority, application Germany, Mar. 13, 1965,
M 64,525
5 Claims. (Cl. 92—231)

This invention relates to a piston for an internal combustion engine and in particular to a piston having a hollow chamber in the piston head adjacent the piston ring zone.

This hollow chamber is formed between the body of the piston and a collar or insert which is welded to a zone of reduced diameter in the piston head by means of a charged particle beam to form welded seams which extend between the contacting surfaces of the piston head and collar member but do not enter the hollow chamber which is used, for example, for the passage of cooling oil.

When the welded seams are formed by a charged particle beam in the manner disclosed by Steigerwald, U.S. Patent No. 2,987,610, the intensity of the charged particle beam is chosen so that the beam completely penetrates the materials being welded together. According to this method, it can be assured that the welded parts are connected together across the entire depth of the seam. It is therefore expected that this method would be especially advantageous in the making of pistons of the type herein contemplated.

The advantages of this charged beam welding method have not been entirely fulfilled. To the contrary, it has been found that the charged particle beam not only completely penertates the material, but when the seam extends into the hollow chamber, the beam pulls along particles of the piston material which are pulled into the hollow chamber. These particles can then get into the oil circulating system of the engine and, furthermore, the portion of the welded seam on the wall of the hollow chamber becomes more or less pitted or porous. Such pits are faulty spots which increase the possibility of the formation of tears and stresses by the notch effect. If the intensity of the charged particle beam is chosen small enough so that the beam does not completely penetrate the material, then, while no particles of piston material can reach the hollow chamber, nevertheless the portion of the unwelded seam adjacent the hollow chamber becomes more or less the starting point for the formation of tears and stresses. As a practical matter, it is not possible to adjust the intensity of the charged beam so that the charged particle beam penetrates exactly up to but not into the hollow chamber. In the copending application of Maier et al., S.N. 492,428, filed Oct. 4, 1965, for "Piston for Internal Combustion Engines," this difficulty was solved by using charged particle beam welded seams which extend from the exterior of the piston into the piston head at a point spaced from the hollow chamber a distance which is equal to the thickness of the completed welded seam so that the heat of welding completes the weld adjacent the hollow chamber without any particles being forced into the chamber.

Such a method permits an allowable tolerance for the actual depth of the charged particle welded seam without impairing the quality of the weld because the charged particle beam weld ends in the body of the piston. The seam portions adjacent the hollow chamber are welded so that cracks from which tears and stresses could start do not exist, and furthermore no pits or faults occur at other places. It is assumed in this method that the position of the collar member with respect to the piston head and with respect to the hollow chamber is maintained very exactly and that the width of the welded seam is exactly positioned relative to the hollow chamber.

In practice, it is very difficult to maintain such exact positioning.

The object of the instant invention is to produce a satisfactory welded piston without the necessity of maintaining such exact positioning between the collar member and the piston head. In general, this and other objects are obtained by the use of annular rings into which the ends of the charged particle beams extend spaced from the hollow chamber.

The means by which the objects of the invention are obtained are described more fully with reference to the accompanying drawings in which:

FIGURE 1 is a cross-sectional view through a portion of a piston showing the welds of this invention; and FIGURES 2 and 3 are similar views respectively of modified forms of the invention.

As shown in FIGURE 1, the piston head 1 has a reduced area portion in which is seated a collar member or insert 2. This collar member is associated with the piston head to form a hollow annular chamber 3 in the piston ring zone of the piston. The outer interior wall 4 of chamber 3 is formed by the collar member 2 and is not welded to the body of the piston. Instead, grooves adjacent and spaced from chamber 3 are filled with metallic rings 5 of circular cross-section. The collar member 2 is joined to the piston by means of charged particle beam welded seams 7 and 8 and within the rings 5. Because the hollow chamber is circular, it is not possible for notch stresses to arise. Danger exists only in the points where the seams 7 and 8 penetrate into the rings 5. If the seam should tear at these points, such tears would follow the contours of the ring and would not be able to exist in any other direction. Thus there is no danger in the joint between the collar 2 and the piston head 1.

In FIGURE 2, there are two hollow chambers 31 between the piston head 1 and the collar member 2. Accordingly, there is an insert 51 in each chamber, respectively. These rings are in the form of split or spring rings and are inserted within the range of the welded seam 7 which extends through the rings 51. Rings 51 prevent axial displacement of collar member 2.

In FIGURE 3, the chamber 32 contains a ring 52 which divides the chamber into two parts and welded seam 8 extends through this ring. If two separate chambers are not desired, then ring 52 is formed with a middle portion 53 composed of a material which can be subsequently removed by a solvent which does not impair the material of either the piston head 1 or the collar member 2. Again, it is possible that the entire ring 52 be completely formed of such a material.

Having now described the means by which the objects of the invention are obtained,

We claim:

1. In an internal combustion engine piston having a piston head with a member inserted therein to form with said piston head a hollow chamber in said piston, and a charged particle beam weld in the seams between said head and said member, the improvement comprising ring means associated with said member and said chamber and through which at least one seam extends for spacing said seam from said chamber.

2. In a piston as in claim 1, said ring means comprising annular rings of circular cross-section, and further comprising grooves adjacent said chamber in which said rings are seated, and said seams having their ends in said rings.

3. In a piston as in claim 1, said chamber being partially in said head and partially in said member, and said ring means being positioned in said chamber.

4. In a piston as in claim 3, further comprising a plurality of chambers lying parallel to the top surface of said head.

5. A piston as in claim 4, said ring means comprising a ring composed at least in part of a material removable by a solvent which does not impair the material of the piston head and said member.

No references cited.

MARTIN P. SCHWADRON, *Primary Examiner.*

G. N. BAUM, *Assistant Examiner.*